United States Patent
Natrajan et al.

(10) Patent No.: US 9,081,818 B2
(45) Date of Patent: Jul. 14, 2015

(54) SAS FABRIC DISCOVERY

(75) Inventors: Balaji Natrajan, Spring, TX (US); Michael G Myrah, Cypress, TX (US); Pruthviraj Herur Puttaiah, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 373 days.

(21) Appl. No.: 13/418,405

(22) Filed: Mar. 13, 2012

(65) Prior Publication Data

US 2013/0246683 A1     Sep. 19, 2013

(51) Int. Cl.
G06F 11/30   (2006.01)
G06F 13/40   (2006.01)
G06F 13/42   (2006.01)

(52) U.S. Cl.
CPC ........ *G06F 11/3051* (2013.01); *G06F 13/4045* (2013.01); *G06F 13/4295* (2013.01)

(58) Field of Classification Search
CPC . G06F 11/3051; G06F 13/40; G06F 13/4004; G06F 13/4027; G06F 13/4045
USPC ......... 710/8–10, 16, 104, 305–306, 311–314, 710/316, 46–47, 109, 220; 370/254–255, 370/257
See application file for complete search history.

(56) References Cited

U.S. PATENT DOCUMENTS

| | | | |
|---|---|---|---|
| 3,316,539 A * | 4/1967 | Carleton ............................ | 710/3 |
| 5,787,252 A * | 7/1998 | Schettler et al. ............. | 709/224 |
| 6,269,396 B1 * | 7/2001 | Shah et al. ..................... | 709/223 |
| 6,377,987 B1 * | 4/2002 | Kracht .......................... | 709/220 |
| 7,377,800 B2 | 5/2008 | Gasser | |
| 7,701,881 B1 * | 4/2010 | Sankaran ....................... | 370/256 |
| 7,822,908 B2 | 10/2010 | Stenfort | |
| 7,882,509 B2 | 2/2011 | Jones et al. | |
| 8,051,436 B2 | 11/2011 | Jones | |
| 2003/0076788 A1 * | 4/2003 | Grabauskas et al. .......... | 370/254 |
| 2005/0185599 A1 * | 8/2005 | Clayton ........................ | 370/254 |
| 2007/0073909 A1 | 3/2007 | Gasser | |
| 2007/0274231 A1 * | 11/2007 | Marks et al. .................. | 370/254 |
| 2009/0007154 A1 * | 1/2009 | Jones ............................ | 719/326 |
| 2009/0103451 A1 * | 4/2009 | Liu et al. ....................... | 370/254 |
| 2009/0125655 A1 * | 5/2009 | Jones et al. .................... | 710/104 |
| 2011/0219158 A1 * | 9/2011 | Davis et al. ................... | 710/300 |
| 2012/0124256 A1 * | 5/2012 | Johnson et al. ............... | 710/105 |
| 2012/0311222 A1 * | 12/2012 | Bowles et al. ................. | 710/315 |
| 2012/0331184 A1 * | 12/2012 | Adar et al. ...................... | 710/22 |

(Continued)

OTHER PUBLICATIONS

Geary, David. "A look at the Composite design pattern". JavaWorld. Online Sep. 13, 2002. Retrieved from Internet Aug. 27, 2014. <http://www.javaworld.com/article/2074564/learn-java/a-look-at-the-composite-design-pattern.html>.*

(Continued)

*Primary Examiner* — Thomas J Cleary
(74) *Attorney, Agent, or Firm* — Hewlett-Packard Patent Department

(57) ABSTRACT

An example method includes (i) creating, by a first serial attached SCSI (SAS) switch, a first topology map describing a portion of a SAS fabric associated with the first SAS switch; (ii) receiving, at the first SAS switch and from a second SAS switch, a second topology map describing a portion of the SAS fabric associated with the second SAS switch; and (iii) merging, by the first SAS switch, the first topology map and the second topology map to produce a consolidated topology map of the SAS fabric.

17 Claims, 8 Drawing Sheets

(56) References Cited

U.S. PATENT DOCUMENTS

2013/0007318 A1* 1/2013 Sarkar et al. .................. 710/74
2013/0295954 A1* 11/2013 Hamalainen et al. ...... 455/456.1

OTHER PUBLICATIONS

Tayek, Ray. "Definition of composite pattern". Stack Overflow. Online Jan. 7, 2012. Retrieved from Internet Aug. 27, 2014. <http://stackoverflow.com/questions/8768032/definition-of-composite-pattern>.*

Brall, Prashant. "Composite Pattern". Prashant Brall's Blog. Online Jun. 5, 2011. Retrieved from Internet Aug. 27, 2014. <http://prashantbrall.wordpress.com/2011/06/05/composite-pattern>.*

Dickson, David. "The Composite Pattern in F#". Online Apr. 28, 2011. Retrieved from Internet Aug. 27, 2014. <http://www.davidkdickson.com/compositepattern>.*

"LSI Launches Sas6160, its 6Gb/s SAS Switch in the Channel"; Oct. 14, 2012; 1 page.

* cited by examiner

SAS FABRIC DISCOVERY

BACKGROUND

A switched fabric is a network topology where multiple network nodes are connected to one another via one or more network switches and one or more physical links. For example, in the context of a large serial attached SCSI (SAS) storage network, multiple initiator devices may connect with multiple target devices via one or more SAS switches and one or more corresponding physical links. The initiator devices may be, for example, host bus adapters (HBAs) and/or controllers, and the target devices may be, for example, end devices such as SAS hard disk drives, serial ATA (SATA) hard disk drives, solid state disks (SSDs), and/or SAS tape drives. Each SAS switch may forward data received from the initiator devices to the target devices, and, conversely, forward data received from the target devices to the initiator devices. Such forwarding may be accomplished based at least in part on the SAS switches' network topology map, which may specify a mapping between the various network nodes, and which may be created/updated via a fabric discovery process.

BRIEF DESCRIPTION OF THE DRAWINGS

Example embodiments are described in the following detailed description and in reference to the drawings, in which.

DETAILED DESCRIPTION

Figure 1:
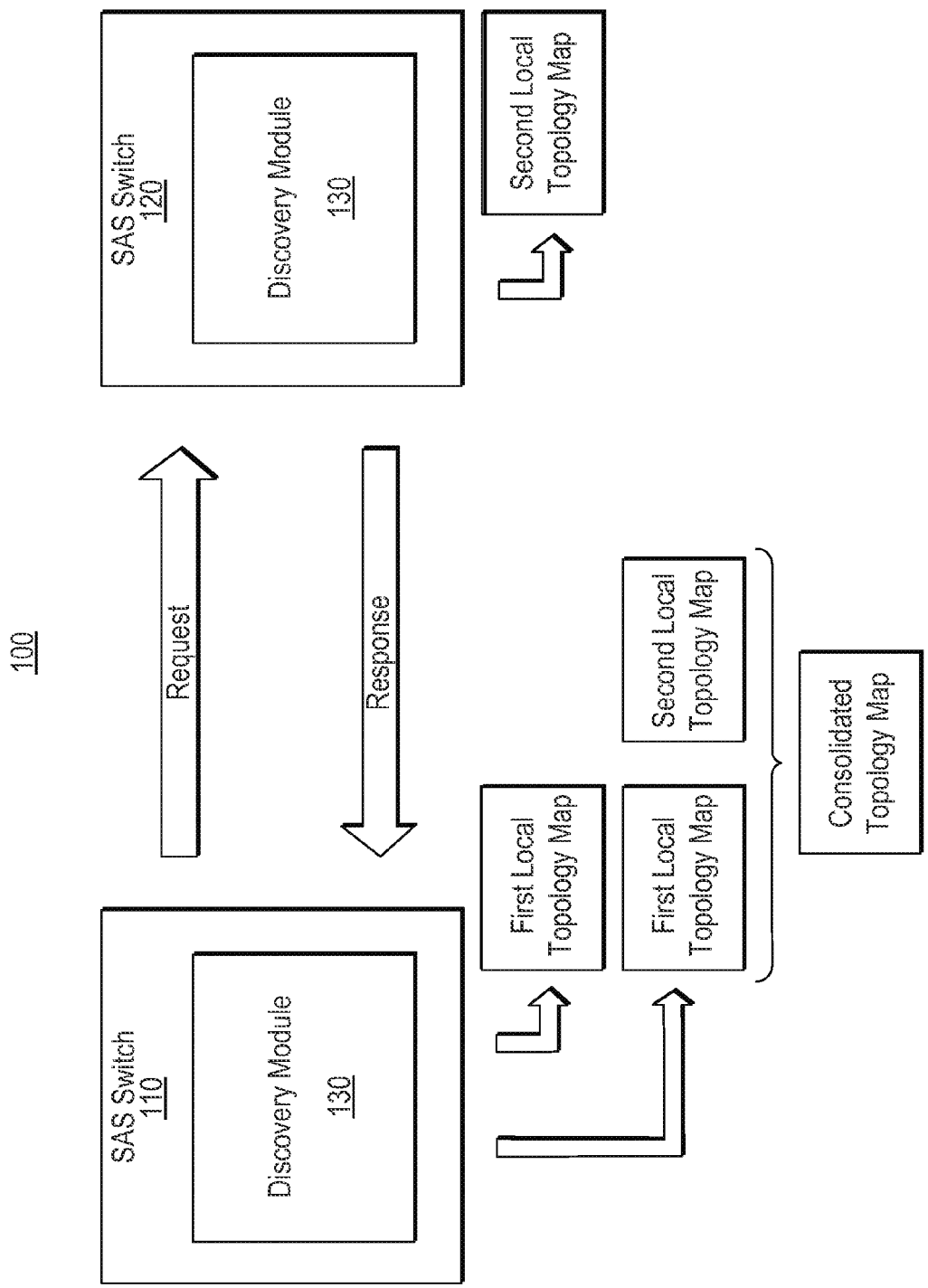
FIG. 1 depicts a system in accordance with an embodiment.

Various embodiments of the present disclosure are directed to network topology discovery. More precisely, various embodiments are directed to reducing the size of fabric an individual SAS switch must perform discovery on to determine the topology for an entire SAS fabric. As discussed in detail below, these inventive embodiments provide for efficient topology discovery no matter the size of the SAS fabric.

In current large SAS storage networks, SAS switches are trunked or daisy chained together to enable communication between the SAS switches and the devices in their respective domains. While this trunking approach allows greater access from a given initiator, the trunking dramatically increases the amount of time required to perform standard SAS discovery. In particular, the discovery time for a given switch increases as a function of the number of switches in the network. This is because the switch must conduct discovery on its own fabric as well as conduct discovery on the other switches' fabrics through those other switches. As a result, the discovery time is often substantially long, and commonly triggers engineering challenges such as timeouts.

Embodiments of the present disclosure address at least the above by utilizing a novel and previously unforeseen network topology discovery approach that does not require each SAS switch to conduct discovery through other SAS switches in order to determine the topology of the entire SAS fabric. In particular, each SAS switch in the SAS fabric is responsible for discovering its own local fabric, and for creating a local topology map based on the local discovery operation. The SAS switches then share their local topology maps with one another, and each switch completes its discovery process by merging the received local topology maps with their own previously created local topology map to produce a consolidated network topology map. As a result, various embodiments significantly reduce the fabric discovery time when compared to current discovery approaches because each switch is responsible for only discovering its respective fabric, and does not have to conduct discovery through other switches in order to determine the topology mapping of the entire fabric. Engineering challenges such as timeouts, therefore, may be eliminated or substantially reduced, a point that is elaborated below with reference to various example embodiments and various illustrative figures.

In one example embodiment of the present disclosure, a SAS switch is provided. The SAS switch comprises a discovery module configured to (i) perform a local discovery operation on a portion of a SAS fabric associated with the SAS switch; (ii) create a first local topology map based at least in part on a result of the local discovery operation; (iii) request a second local topology map from an adjacent SAS switch; (iv) receive the second local topology map from the adjacent SAS switch; and (v) create a consolidated topology map by merging the first local topology map with the second local topology map received from the adjacent SAS switch.

In a further example embodiment of the present disclosure, a process is provided. The process comprises (i) creating, by a first SAS switch, a first topology map describing a portion of a SAS fabric associated with the first SAS switch; (ii) receiving, at the first SAS switch and from a second SAS switch, a second topology map describing a portion of the SAS fabric associated with the second SAS switch; and (iii) merging, by the first SAS switch, the first topology map and the second topology map to produce a consolidated topology map of the SAS fabric.

In another example embodiment of the present disclosure, a non-transitory computer-readable medium is provided. The non-transitory computer-readable medium comprises instructions that when executed cause a first SAS switch to (i) perform a local discovery operation on a fabric that does not extend beyond a second SAS switch; (ii) create a first topology map based at least in part on a result of the local discovery operation; (iii) obtain a second topology map from the second SAS switch; and (iv) merge the first topology map and second topology map to create a consolidated topology map.

FIG. 1 depicts a system 100 in accordance with an embodiment. It should be readily apparent that the system 100 represents a generalized illustration and that other elements may be added or existing elements may be removed, modified, or rearranged without departing from the scope of the present disclosure. For example, while the system 100 depicted in FIG. 1 includes only two SAS switches, the system may actually comprise many more SAS switches, and only two have been shown and described for simplicity.

The system 100 comprises a first SAS switch 110 and a second SAS switch 120. Each SAS switch may generally be understood as a computer networking device that is configured to connect network nodes (e.g., initiators, targets, switches, etc.) via physical links. In one example, the first SAS switch 110 and the second SAS switch 120 may be Hewlett Packard (HP) 6 Gb/s SAS BL switches. The switches may be implemented in a SAS storage architecture, and may be used by initiators to access shared SAS storage (e.g., the HP D6000 family of disk enclosures) via the SAS fabric. The switches may be trunked or daisy chained together via a physical link to enable communication between the switches.

Each switch may comprise a discovery module 130. The discovery module 130 may comprise hardware, software, or a combination of both. For example, discovery module 130 may comprise an application-specific integrated circuit (ASIC). Alternatively or in addition, the discovery module 130 may comprise at least a processing device and a memory. The processing device may correspond to a device that generally retrieves and executes the instructions stored in the memory. For example, the processing device may be a central processing unit (CPU), processor, microcontroller, or the like. The memory may correspond to any typical storage device that stores computer-implemented instructions, such as programming code or the like. For example, the memory may include one or more of a non-volatile memory, a volatile memory, and a storage device. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some embodiments, the processing device and memory may be integrated into a single device. While in other embodiments, the processing device and memory may be discrete components on the switches.

In some embodiments, the first switch 110 and/or second switch 120 may comprise one or more expanders within a single chassis, where one of the expanders comprises the discovery module 130. In other embodiments, the first switch 110 and/or second switch 120 may similarly comprise one or more expanders within a single chassis, but the discovery module 130 may reside inside the chassis and external to the one or more expanders. That is, the discovery module 130 may not be part of the one or more expanders within the switch chassis.

Turning now to the operation of the system 100, in response to a trigger (e.g., a command or predetermined time interval), the first switch 110 may be configured to initiate a local discovery operation on a portion of fabric associated with the first switch 110. Such local discovery may include, e.g., the first switch 110 identifying the host bus adapters, storage devices, controllers, PHYs, ports, and/or expanders within its local fabric. The discovery is "local" because the discovery operation does not extend beyond a trunk edge. That is, each switch is configured to discover its own fabric and not conduct discovery on the fabric associated with other switches. While other switches may be identified during the discovery process, the switch is configured to avoid discovery of the fabrics associated with those identified switches. Stated differently, each switch conducts discovery and, if another switch is discovered, the discovery operation does not extend beyond that point. This may be accomplished by, for example, the switch marking the SAS address of the other switches identified during the discovery process and blocking discovery beyond those identified switches.

Upon completion (or during) the local discovery operation, the first switch 110 may begin creating a first local topology map based at least in part on the results of the local discovery operation. This local topology map may be created in a dynamic manner as discovery results are obtained or in a single action after the local discovery operation is completed. The local topology map may generally describe the interconnection pattern between the various devices in the fabric. More specifically, the local topology map may describe the connection pattern between the ports/PHYs of the switch and the ports/PHYs of the connected devices (e.g., initiators, targets, other switches, and/or expanders). Information such as target devices, storage enclosures, device environmental information, port/PHY identifiers, port/PHY addresses, device identifiers, MAC addresses, and the like may be included. In addition, the local topology map may be described in the form of a table, chart, text file, graphical depiction, or the like. Furthermore, the local topology map (as well as the consolidated topology map) may be based at least in part on the composite design pattern software construct.

Once a local discovery operation is complete at the first switch 110, the first switch 110 may set a LOCAL DISCOVERY COMPLETE flag to "true" to indicate that the local discovery operation at the first switch 110 is complete. The first switch 110 may then proceed to transmit a GET DISCOVERY STATUS message to neighboring switches to determine the local discovery status of the neighboring switches. This may be accomplished via SCSI Management Protocol (SMP) messaging in some embodiments. For example, the first switch 110 may utilize SMP messaging to transmit a GET DISCOVERY STATUS message to the second switch 120. Thereafter, the first switch 110 may begin receiving corresponding status reply messages from the neighboring switches, wherein a LOCAL DISCOVERY COMPLETE status indication in the message may be set to "true" or "false." For example, the first switch 110 may receive a LOCAL DISCOVERY COMPLETE message set to "true" from the second switch 120 indicating that the second switch 120 has completed a local discovery operation on its respective fabric. Alternatively, the first switch 110 may receive a LOCAL DISCOVERY COMPLETE message set to "false" from the second switch 120. In this case, the first switch 110 may wait a specific time period (e.g., 10 ms) and transmit another GET DISCOVERY STATUS message to the second switch 120.

Upon receiving an indication from a neighboring switch informing the first switch 110 that the neighboring switch's local discovery is complete, the first switch 110 may transmit a local topology map request message to the respective switch. For example, in response to receiving a LOCAL DISCOVERY COMPLETE message set to "true" from the second switch 120, the first switch 110 may proceed to transmit a GET FABRIC TOPOLOGY MAP message to the second switch 120. This message requests the second local topology map from the second switch 120. The second switch 120 may receive this message and return the previously created second local topology map. The first switch 120 may then, upon receiving the second local topology map, create a consolidated topology map by merging the second local topology map provided by the second switch 120 with the first local topology map created by the first switch 110, as described in greater detail below with respect to FIGS. 5-7. This process may continue until all local topology maps have been received from all switches in the fabric. In certain embodiments, the first switch 110 may wait until all local fabric topology maps are received from all switches in the fabric before conducting the merge operation. In other embodiments, the first switch 110 may continuously merge the maps as the fabric maps are received. After merging the topology maps to create the consolidated topology map, the discovery operation is complete for the SAS fabric.

In some embodiments, after discovery is complete and the consolidated topology map is generated, the first switch 110 may proceed to conduct other operations. For example, the first switch may send a BROADCAST (CHANGE) or another relevant SAS primitive on each of the first switch's PHYs to inform other devices in the SAS fabric (e.g., an initiator such as an array controller) that aspects of the SAS fabric may have changed. In response to receiving such a primitive, the other devices on the SAS fabric may conduct their own discovery process to determine what has potentially changed in the fabric.

Figure 2:
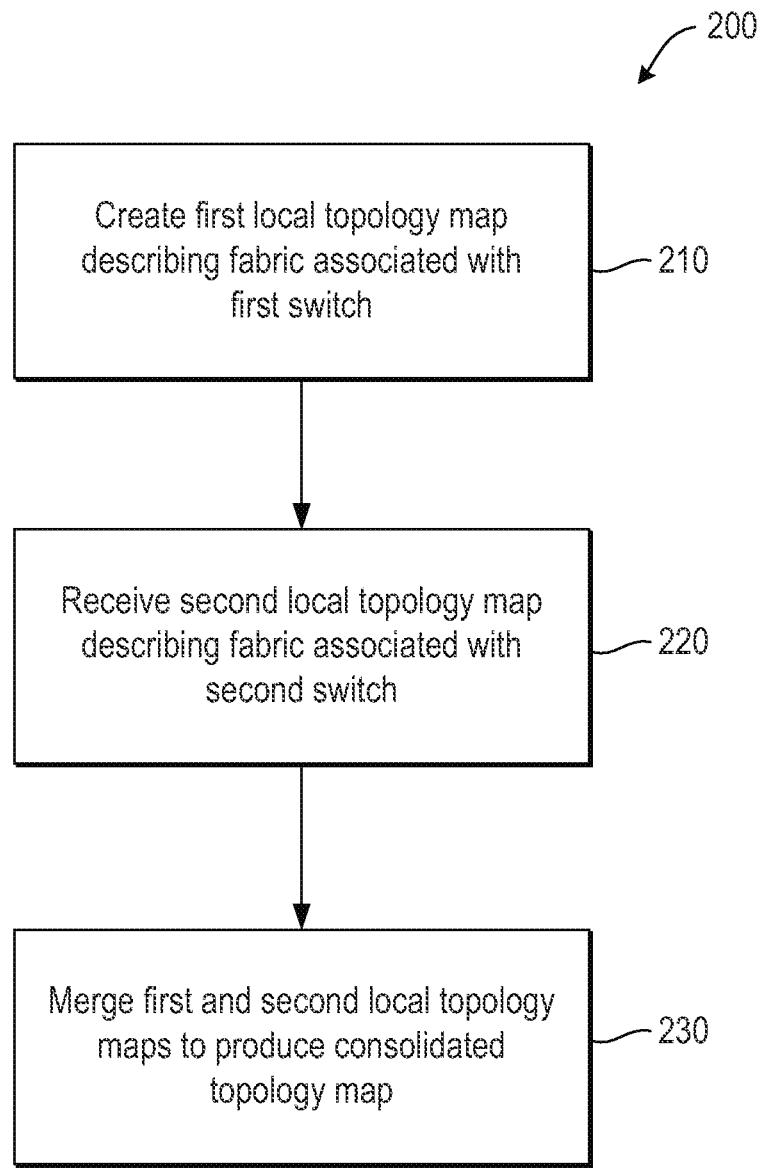
FIG. 2 depicts a process flow diagram in accordance with an embodiment.

FIG. 2 depicts a process flow diagram 200 in accordance with an embodiment. It should be readily apparent that the processes depicted in FIG. 2 (as well as FIG. 3) represents generalized illustrations, and that other processes may be added or existing processes may be removed, modified, or rearranged without departing from the scope and spirit of the present disclosure. Further, it should be understood that the processes may represent executable instructions stored on memory that may cause a processing device to respond, to perform actions, to change states, and/or to make decisions. Thus, the described processes may be implemented as executable instructions and/or operations provided by a memory associated with a SAS switch. Alternatively or in addition, the processes may represent functions and/or actions performed by functionally equivalent circuits like an analog circuit, a digital signal processing device circuit, an application specific integrated circuit (ASIC), or other logic devices associated with a SAS switch. Furthermore, FIG. 2 (as well as FIG. 3) is not intended to limit the implementation of the described embodiments, but rather the figure illustrates functional information one skilled in the art could use to design/fabricate circuits, generate software, or use a combination of hardware and software to perform the illustrated processes.

The process may begin at block 210, where a first SAS switch creates a first topology map describing a portion of a SAS fabric associated with the first SAS switch. As discussed above, this topology map may be based on a local discovery operation. Thereafter, at block 220, the first SAS switch may receive a second topology map describing a portion of the SAS fabric associated with the second SAS switch. The first SAS switch may then, at block 230, merge the first topology map and the second topology map to produce a consolidated topology map of the SAS fabric.

Figure 3:
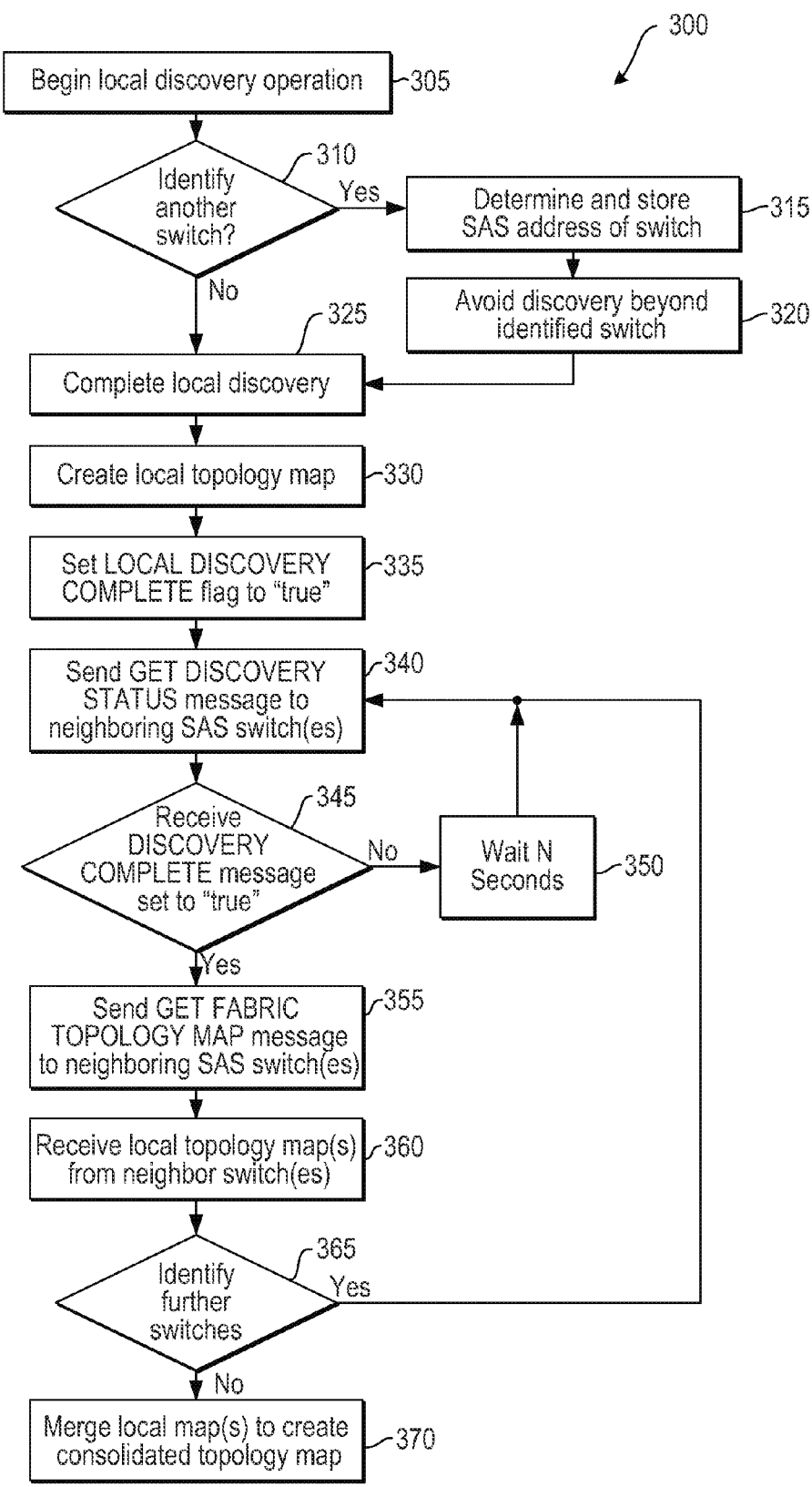
FIG. 3 depicts a process flow diagram in accordance with another embodiment.

FIG. 3 depicts a more detailed process flow diagram 300 in accordance with another embodiment. The process 300 begins at block 305, where a first SAS switch within a SAS fabric initiates a local discovery operation on the fabric associated with the first SAS switch. As mentioned above, this discovery operation may comprise the SAS switch transmitting SMP frames or commands to learn what devices are currently present in the fabric. Such components may be, for example, PHYs, expanders, HBAs, SSDs, tape drive, JBODs, end devices, array controllers, and the like. If another switch is identified during the local discovery operation at block 310, the first switch determines and records the SAS address of the identified switch at block 315. Then, at block 320, the first switch proceeds with the local discovery operation while avoiding discovery beyond the identified switch. At block 325, the first switch completes the local discovery operation on its respective fabric. At block 330, the first switch creates a local topology map based at least in part on the results of the local discovery operation. The local topology map may comprise, for example, the interconnection pattern between the first switch and the devices directly or indirectly connected thereto (e.g., target devices, initiator devices, expanders, and/or switches).

At block 335, the first switch proceeds to set a LOCAL DISCOVERY COMPLETE flag to "true." By doing so, the first switch is indicating that it has completed a local fabric discovery operation on its respective fabric. That is, the first switch has completed discovering all devices in its local fabric that are discoverable. At block 340, the first switch proceeds to determine the current status of other switches by transmitting a GET DISCOVERY STATUS message to the other switches. This message may be sent, for example, to neighboring switches identified during the local discovery operation. The neighboring switches may receive the GET DISCOVERY STATUS message from the first switch and return a DISCOVERY COMPLETE message set to either "true" or "false" at block 345. In response to receiving a DISCOVERY COMPLETE message set to "false" from one or more neighboring switches, the first switch may wait N seconds (e.g., 10 ms) and retransmit the GET DISCOVERY STATUS message to the one or more neighboring switches. On the other hand, in response to receiving a DISCOVERY COMPLETE message set to "true" from one or more neighboring switches, the first switch may proceed to send a GET FABRIC TOPOLOGY MAP message to the one or more neighboring switches at block 355. This message requests that the one or more neighboring switches send their respective local topology maps to the first switch. Thereafter, at block 360, the first switch may receive local topology maps from the one or more neighboring switches.

At block 365, upon inspection of a neighboring switch's local topology map, the first switch may determine that there are additional switches in the fabric beyond the neighboring switches. In such a case, first switch may proceed to obtain the topology maps from those additional switches by re-conducting the process discussed above with respect to blocks 340-360 for the additional switches. At block 370, upon receiving all the topology maps from all identified switches, the first switch may merge the received topology maps with the map the first switch created to form a consolidated topology map. Alternatively, the first switch may conduct this process on an on-going basis as topology maps are received from various switches in the fabric.

At this point, the discovery operation is complete, as the first switch has determined the topology of the SAS fabric and created a corresponding topology map. The first switch may then proceed to conduct other functions such as sending a BROADCAST (CHANGE) or another relevant SAS primitive on all associated switch PHYs to inform other devices on the SAS fabric (e.g., an initiator such as an array controller) that aspects of the SAS fabric may have changed. In response to receiving this primitive, the other devices on the SAS fabric may conduct their own discovery process to determine what has potentially changed in the fabric. In certain cases where the other devices do not support a discovery process in accordance with the present disclosure, the devices may conduct standard SAS fabric discovery.

In accordance with certain embodiments, each switch in a SAS fabric may conduct the above-mentioned processes of FIG. 3 in parallel. Thus, if there were five switches in the SAS fabric, each of the five switches would create local topology maps, obtain fabric topology maps from the other four switches, and merge the maps to create a consolidated topology map. Thus, at the end of the process, each of the five switches would have a consolidated topology map of the SAS fabric.

Figure 4:
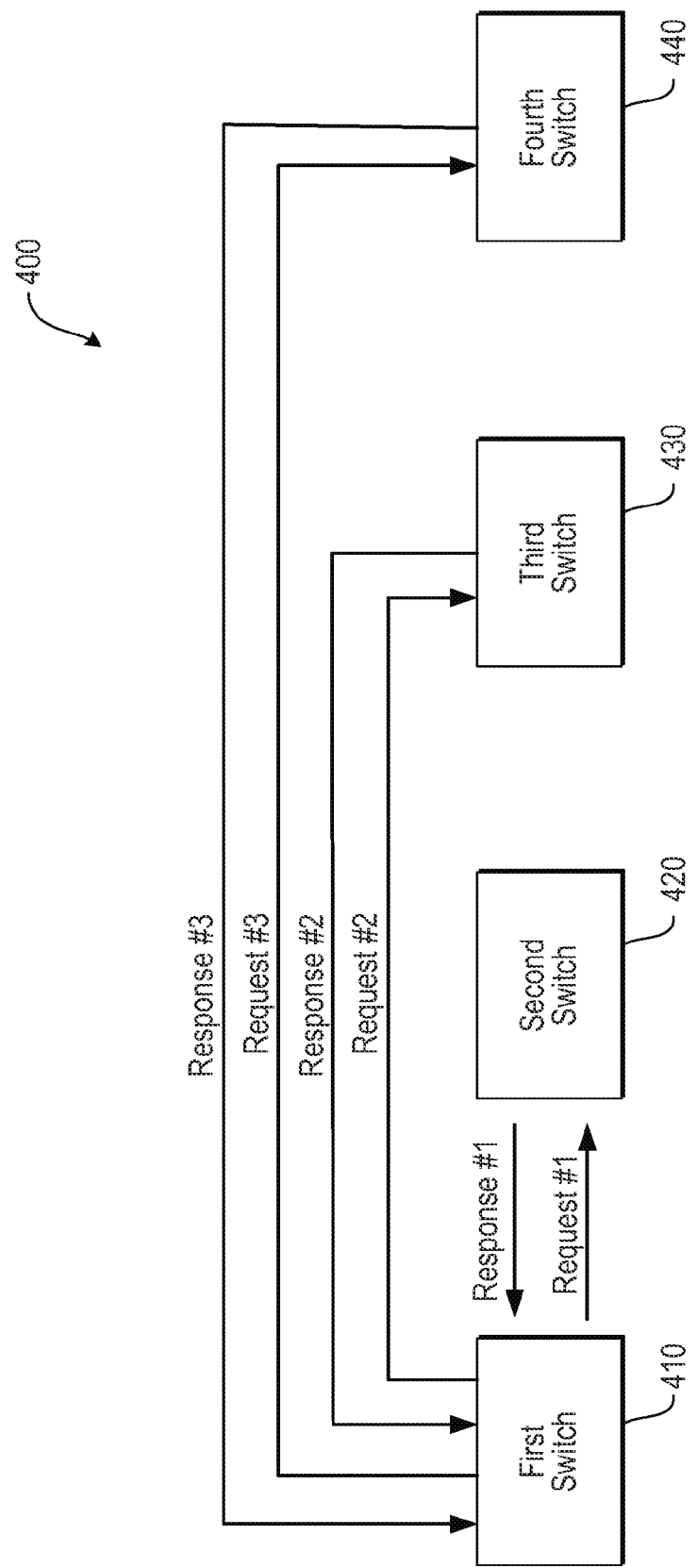
FIG. 4 depicts a system in accordance with an embodiment.

FIG. 4 depicts an example system 400 in accordance with an embodiment. The system 400 comprises a first switch 410, a second switch 420, a third switch 430, and a fourth switch 440. The first switch is configured to send a request for a local topology map (i.e., "Request #1") to the second switch 420. As mentioned above, this request may be in the form of a GET FABRIC TOPOLOGY MAP message. Further, as mentioned above, this request may occur after the first switch 410 conducts local discovery, creates a local topology map, and/or determines that local discovery is complete at the second switch 420.

Upon receiving Request #1 from the first switch 410, the second switch 420 may transmit a response (i.e., "Response #1) comprising the second switch's local topology map. The second switch's local topology map may comprise information about the second switch's discovered fabric, including neighboring switches that the second switch 420 discovered during its discovery process (e.g., the third switch 430.) The first switch 410 may receive the second switch's local topology map and, upon inspection, determine that the SAS fabric includes a third switch 430 that it was previously unaware of. The first switch 410 may then transmit a request for a local topology map (i.e., "Request #2") to the third switch 430. This request may be in the form of a GET FABRIC TOPOLOGY MAP message. The third switch 430 may receive Request #3 and, in response, transmit a response (i.e., "Response #2) comprising the third switch's local topology map. The third switch's local topology map may comprise information about the third switch's discovered fabric, including neighboring switches that the third switch 430 discovered during its discovery process (e.g., the fourth switch 440.) Upon inspection of Response #2, the first switch 410 may determine that there is a fourth switch 440 in the SAS fabric that it was previously not aware of. The first switch 410 may therefore transmit Request #3 to the fourth switch 440 to obtain the fourth switch's local topology map. In response to receiving the fourth switch's topology map in Response #3, the first switch 410 may determine that all switches in the SAS fabric have been identified and local topology maps have been received from each switch. The first switch 410 may therefore proceed to merge the received topology maps to create a consolidated fabric map. Alternatively, the first switch 410 may merge the topology maps on an on-going basis as they are received from the second switch 420, third switch 430, and fourth switch 440.

Figure 5:
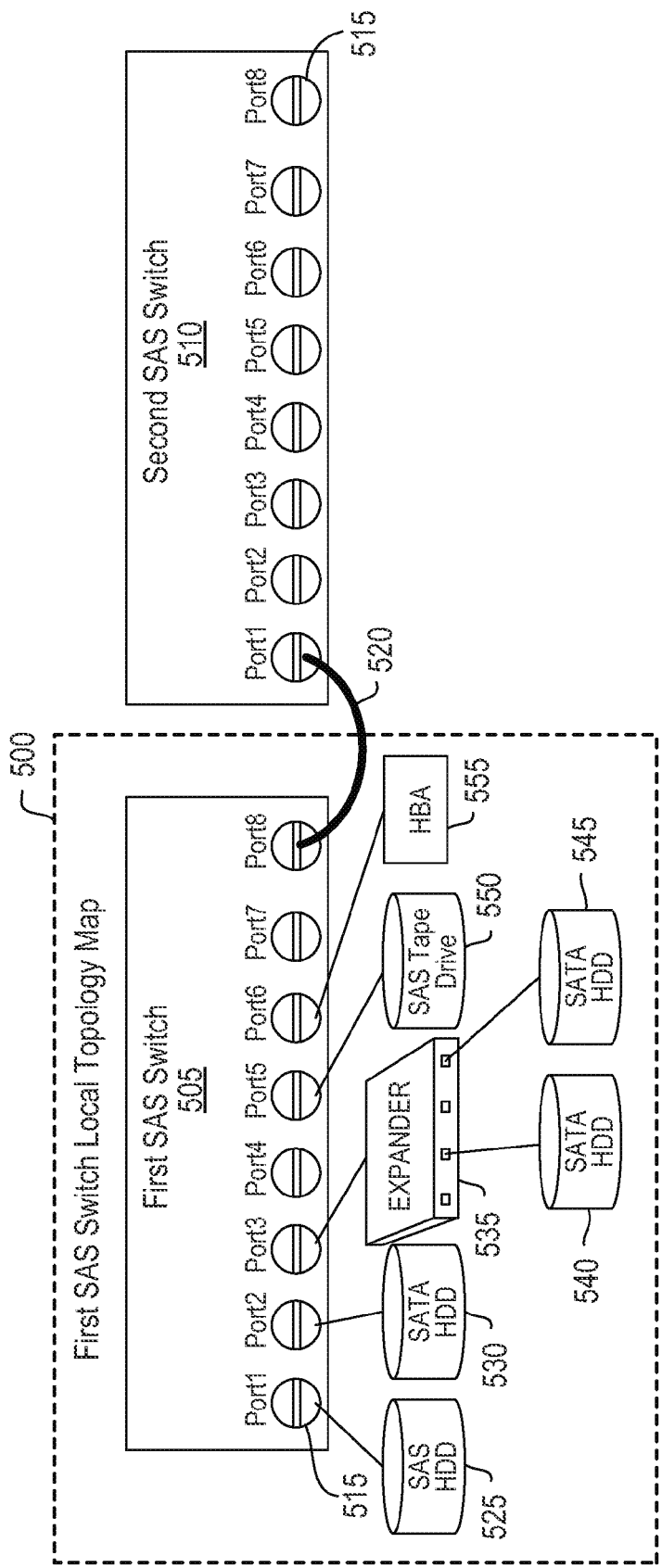
FIG. 5 depicts a local topology map created by a first SAS switch in accordance with an embodiment.

FIG. 5 is a graphical depiction of a local topology map in accordance with an embodiment. In particular, FIG. 5 depicts a local topology map 500 created by a first SAS switch 505 in response to a local discovery operation. While shown graphically, it should be understood that this local fabric information may be represented and shared in other forms (e.g., as a table, chart, text file, etc.).

The local topology map 500 describes the interconnection pattern between various devices and the first SAS switch 505. More particularly, the local topology map 500 may express the interconnection patterns between the various ports 515 (and/or their respective PHYs) of the first SAS switch 505 and various initiator/target devices and their respective ports/PHYs. As mentioned above, the fabric map is "local" insofar as the map and associated discovery process does not extend beyond the trunk edge. Thus, and with reference to FIG. 5, the first SAS switch 505 does not conduct discovery beyond the edge of trunk 520. While the second SAS switch 510 may be identified during the discovery process, discovery is not conducted with regard to that switch's fabric. However, the first SAS switch's local fabric topology map 500 may include information indicating that an adjacent SAS switch is present via trunked connection 520.

As shown in FIG. 5, the first SAS switch's local topology map 500 may indicate connections between the various ports and various targets/initiators/expanders. For example, the local topology map 500 may indicate that port 1 is connected to SAS HDD 525, port 2 is connected to SATA HDD 530, port 3 is connected to expander 535 (which is itself connected to SATA HDD 540 and SATA HDD 545), port 4 is idle, port 5 is connected to SAS tape drive 550, port 6 is connected to host bus adapter (HBA) 555, port 7 is idle, and port 8 is trunked to the second SAS switch 510. With specific regard to expander 535, the first SAS switch 505 is configured to determine whether or not the expander 535 is part of a SAS switch. If the expander is part of a SAS switch, discovery does not extend beyond that point. On the other hand, if the expander is not part of a SAS switch, further discovery is conducted and, for example, the SATA HDD 540 and SATA HDD 545 are discovered and included in the local topology map.

Figure 6:
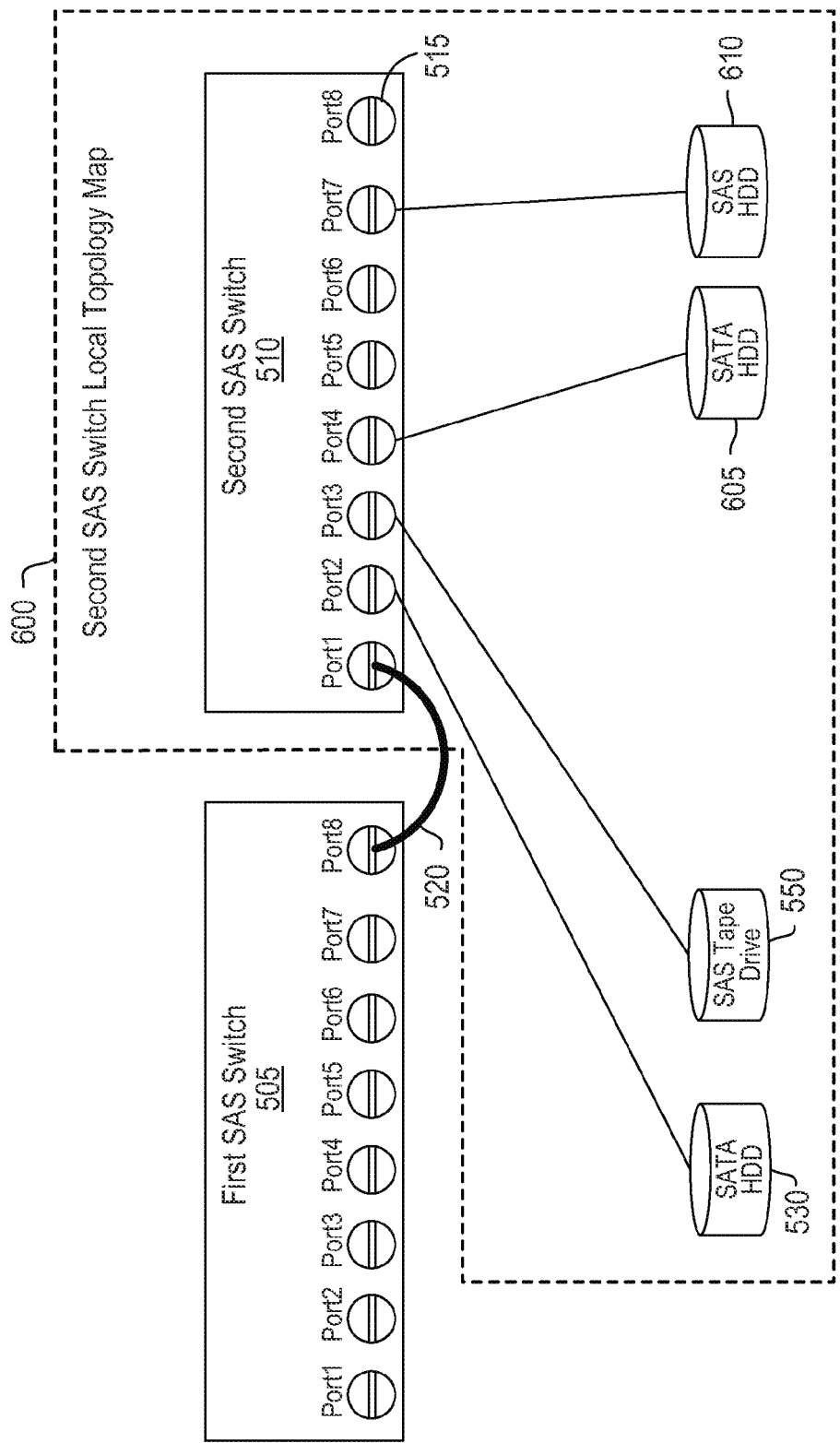
FIG. 6 depicts a local topology map created by a second SAS switch in accordance with an embodiment.

FIG. 6 is a graphical depiction of another local topology map 600 created by a second SAS switch 510 in response to a local discovery operation. Similar to FIG. 5, the local topology map does not extend beyond the trunk edge, and comprises the interconnection pattern between ports/PHYs on the switch and the targets/initiators. As shown, port 1 is trunked to the first SAS switch 505, port 2 is connected to SAS HDD 530 (shared with the first SAS switch 505), port 3 is connected to SAS tape drive 550 (shared with first SAS switch 505), port 4 is connected to SATA HDD 605, ports 5 and 6 are idle, port 7 is connected to SAS HDD 610, and port 8 is idle.

Figure 7:
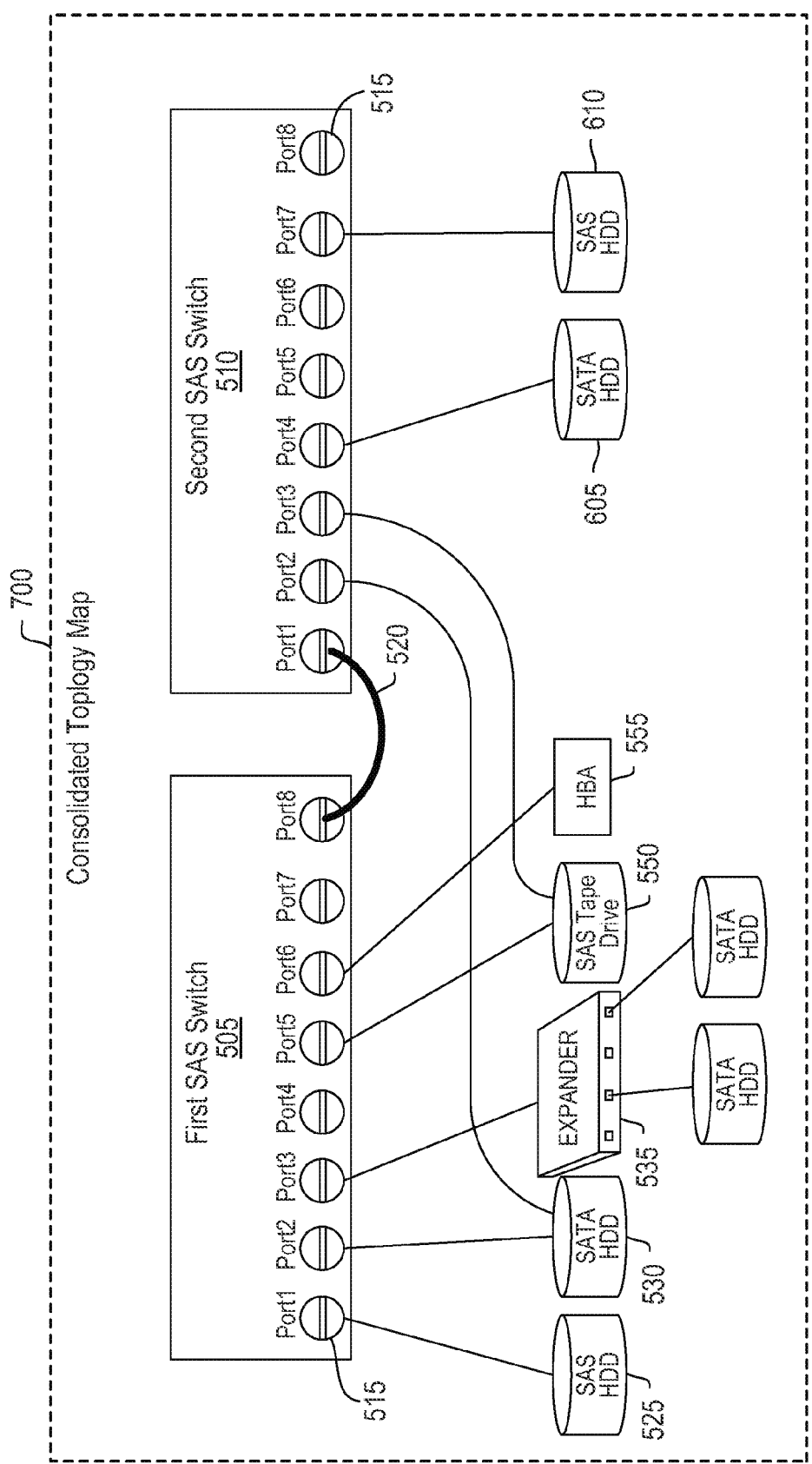
FIG. 7 depicts a consolidated topology map created by merging a first local topology map and a second local topology map in accordance with an embodiment.

FIG. 7 is a graphical depiction of a consolidated topology map 700 created by merging the first SAS switch local topology map 500 and the second SAS switch local topology map 600. As described above, this consolidated topology map 700 may be created by the first SAS switch 505 upon reception of the second SAS switch local topology map 600 from the second SAS switch 510. Similarly, the consolidated topology map 700 may be created by the second SAS switch 510 upon reception of the first SAS switch local topology map 500 from the first SAS switch 505.

As shown, the consolidated topology map 700 comprises all of the switch, target, expander, and/or initiator connections from the first SAS switch local topology map 500 and the second SAS switch local topology map 600. In some instances, multiple connections may be made to the same device. For example, SATA HDD 530 is coupled to port 1 on the first SAS switch 505 and to port 2 on the second SAS switch 510. Similarly, SAS tape drive 550 is connected to port 5 on the first SAS switch 505 and port 3 on the second SAS switch 510.

While FIGS. 5-7 are shown with only two SAS switches in the SAS fabric, it should be understood that the above-described methodology may be applied to any number of SAS switches. For example, in a large enterprise environment comprising 20 SAS switches trunked together, each SAS switch may conduct local discovery and thereafter create a consolidated topology map based on local topology maps received from the other 19 SAS switches. Unlike current approaches, which would require each SAS switch to conduct discovery of the entire fabric through the other 19 SAS switches, the approach of the present disclosure streamlines this process by requiring each switch to only conduct discovery on its local fabric, and merge a created local topology map with local topology maps received from the other 19 SAS switches. As a result, the total SAS fabric time may be dramatically reduced, and errors such as timeouts may be minimized or even eliminated.

Figure 8:
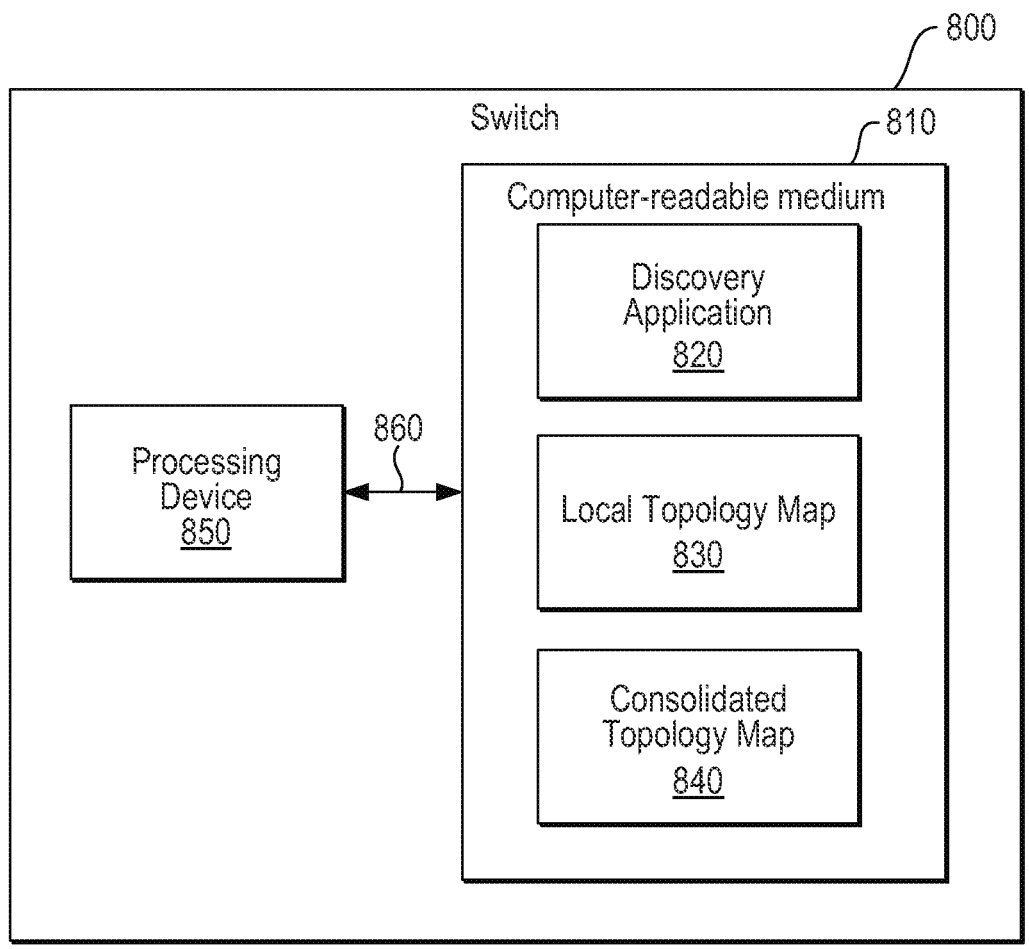
FIG. 8 depicts a non-transitory computer-readable medium that stores instructions for operating a switch in accordance with an embodiment.

FIG. 8 depicts a non-transitory computer-readable medium that stores instructions for operating a switch in accordance with various embodiments. The non-transitory computer-readable medium is generally referenced by reference number 810 and may be included in switch 800. The non-transitory computer-readable medium 810 may correspond to any typical storage device that stores computer-implemented instructions, such as programming code or the like. For example, the non-transitory computer-readable medium 810 may include one or more of a non-volatile memory, a volatile memory, and/or a storage device. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some embodiments, the instructions may be part of an installation package that can be executed by the processing device 850. In this case, the non-transitory computer-readable medium 810 may be a portable medium such as a CD, DVD, or flash drive or a memory maintained by a server from which the installation package can be downloaded and installed. In another embodiment, the instructions may be part of an application or application already installed. Here, the non-transitory computer-readable medium 810 can include integrated memory such as a hard drive.

The processing device 850 generally retrieves and executes instructions stored in the non-transitory computer-readable medium 810 to operate the switch 800 in accordance with the above-described embodiments. In an embodiment, the processing device 850 may access the non-transitory computer-readable medium 810 via a bus 860. A first region of the non-transitory computer-readable medium 810 may store a discovery application 820 configured to conduct local discovery, and to create a local topology map 830 and a consolidated topology map 840 in the manner described above with respect to FIGS. 1-7. A second region of the non-transitory computer-readable medium 810 may store the local topology map 830. A third region of the non-transitory computer-readable medium 810 may store the consolidated topology map 840. While shown as discrete regions, it should be understood that these regions may overlap or be merged into one or more regions.

While the above disclosure has focused on SAS environments, it should be understood that the various embodiments are applicable to other networked environments. Furthermore, while the above disclosure has been shown and described with reference to the foregoing exemplary embodiments, it should be understood that other forms, details, and embodiments may be made without departing from the spirit and scope of the disclosure that is defined in the following claims.

What is claimed is:

1. A serial attached SCSI (SAS) switch comprising:
    a discovery module to perform a local discovery operation on a portion of a SAS fabric associated with the SAS switch;
    create a first local topology map based at least in part on a result of the local discovery operation;
    request a second local topology map from an adjacent SAS switch;
    receive the second local topology map from the adjacent SAS switch;
    request a local discovery status of the adjacent SAS switch prior to receiving the second local topology map from the adjacent SAS switch;
    create a consolidated topology map by merging the first local topology map with the second local topology map received from the adjacent SAS switch, wherein the discovery module is to, after creating the consolidated topology map, send a SAS primitive on each PHY indicating to other devices that a change occurred;
    identify a SAS switch that is beyond the adjacent SAS switch based on the second local topology map;
    request an additional local topology map from the SAS switch that is beyond the adjacent SAS switch; and
    merge the additional local topology map to the consolidated topology map, wherein the identify the SAS switch that is beyond the adjacent SAS switch, the request the additional local topology map and the merge the additional local topology map to the consolidated topology map are performed repeatedly until all local topology maps are received from all SAS switches.

2. The SAS switch of claim 1, wherein the SAS switch and the adjacent SAS switch are trunked together.

3. The SAS switch of claim 1, wherein the local discovery operation does not extend beyond a trunk edge.

4. The SAS switch of claim 1, wherein the discovery module is further to set a flag when the local discovery operation is complete.

5. The SAS switch of claim 1, wherein the SAS switch requests the second local topology map from the adjacent SAS switch after receiving an indication from the adjacent SAS switch that the adjacent SAS switch has completed a local discovery operation.

6. The SAS switch of claim 1, wherein the SAS switch comprises a chassis and plurality of expanders, and wherein one of the plurality of expanders comprises the discovery module, or wherein the discovery module resides on the SAS switch external to the plurality of expanders.

7. A non-transitory computer-readable medium comprising instructions that when executed cause a first serial attached SCSI (SAS) switch to:
    perform a local discovery operation on a fabric that does not extend beyond a second SAS switch;
    create a first topology map based at least in part on a result of the local discovery operation;
    obtain a second topology map from the second SAS switch;
    merge the first topology map and second topology map to create a consolidated topology map;
    after creating the consolidated topology map, cause the first SAS switch to send a SAS primitive on each PHY indicating to other devices that a change occurred wherein the instructions cause the first SAS switch to perform the local discovery operation that does not extend beyond the second SAS switch by marking a SAS address of the second SAS switch when the second SAS switch is discovered and not conducting discovery on a fabric associated with the second SAS switch;
    identify a SAS switch that is beyond the second SAS switch based on the second topology map;
    request an additional topology map from the SAS switch that is beyond the second SAS switch; and
    merge the additional topology map to the consolidated topology map, wherein the identify the SAS switch that is beyond the second SAS switch, the request the additional topology map and the merge the additional topology map to the consolidated topology map are performed repeatedly until all topology maps are received from all SAS switches.

8. The non-transitory computer-readable medium of claim 7, wherein the instructions further cause the first SAS switch to request local discovery status of the second SAS switch prior to obtaining the second topology map from the second SAS switch.

9. The non-transitory computer-readable medium of claim 7, wherein the first SAS switch and second SAS switch are adjacent SAS switches that are trunked together.

10. The non-transitory computer-readable medium of claim 7, wherein the instructions further cause the first SAS switch to determine whether the second SAS switch has completed a local discovery operation.

11. The non-transitory computer-readable medium of claim 7, wherein the first and second topology maps describe a connective relationship between one or more PHYs, switches, expanders, hard disk drives, tape drives, host bus adapters, and controllers.

12. The non-transitory computer-readable medium of claim 7, wherein the first topology map, second topology map, and consolidated topology map are based at least in part on a composite design pattern software construct.

13. A method comprising:
creating, by a first serial attached SCSI (SAS) switch, a first topology map describing a portion of a SAS fabric associated with the first SAS switch;
identifying other switches and avoiding discovery of fabrics associated with the other switches;
receiving, at the first SAS switch and from a second SAS switch, a second topology map describing a portion of the SAS fabric associated with the second SAS switch;
merging, by the first SAS switch, the first topology map and the second topology map to produce a consolidated topology map of the SAS fabric;
after creating the consolidated topology map, sending, by the first SAS switch, a SAS primitive on each PHY of the first SAS switch indicating to other devices that a change occurred
identifying a SAS switch that is beyond the second SAS switch based on the second topology map;
requesting an additional topology map from the SAS switch that is beyond the second SAS switch; and
merging the additional topology map to the consolidated topology map, wherein the identifying the SAS switch that is beyond the second SAS switch, the requesting the additional topology map and the merging the additional topology map to the consolidated topology map are performed repeatedly until all topology maps are received from all SAS switches.

14. The method of claim 13, further comprising conducting, by the first SAS switch, a local discovery operation on the SAS fabric, wherein the local discovery operation does not extend beyond the second SAS switch.

15. The method of claim 14, further comprising setting, by the first SAS switch, a flag when the local discovery operation is complete.

16. The method of claim 13, further comprising determining, by the first SAS switch, when a local discovery operation of the second SAS switch is complete.

17. The method of claim 13, further comprising in response to receiving the SAS primitive, the other devices conducting their own discovery process to determine what has potentially changed in the SAS fabric.

* * * * *